United States Patent [19]
Faroni

[11] 3,924,507
[45] Dec. 9, 1975

[54] FASTENER APPARATUS

[75] Inventor: Charles C. Faroni, Summit, N.J.

[73] Assignee: Amerace Corporation, New York, N.Y.

[22] Filed: Feb. 1, 1974

[21] Appl. No.: 438,851

Related U.S. Application Data

[63] Continuation of Ser. No. 341,824, March 16, 1973, abandoned.

[52] U.S. Cl. ..................... 85/9 R; 85/50 R; 81/425
[51] Int. Cl.² ..................... F16B 19/00; F16B 23/00
[58] Field of Search ........... 81/425, 5.1 R; 151/170; 85/45, 9 R, 50 R, 32 R

[56] References Cited
UNITED STATES PATENTS

| | | | |
|---|---|---|---|
| 641,191 | 1/1900 | Champion | 85/32 R |
| 2,550,866 | 5/1951 | Rosan | 85/45 |
| 2,608,229 | 8/1952 | Brutus | 151/7 |
| 2,836,918 | 6/1958 | Pula et al. | 85/45 |
| 3,060,785 | 10/1962 | Corlett et al. | 85/45 X |

*Primary Examiner*—James L. Jones, Jr.
*Attorney, Agent, or Firm*—S. Michael Bender; Richard A. Craig

[57] ABSTRACT

Theft-resistant fastener apparatus for attaching an object to a platform is disclosed. The apparatus employs a shoulder bolt having a hardened, smooth, non-wrenchable head and a cup-washer rotatably positioned on the bolt to partially enclose the head. Force can be applied by an installation tool (also disclosed) to hold the bolt and washer together so that a torquing moment can be applied to the apparatus to thread the bolt into the object. When the bolt is seated the force is removed the washer is free to rotate on the bolt, thwarting efforts to unscrew the bolt from the object. Hardened rotatable sheathing means for protecting any exposed portion of the shank of the bolt are also disclosed.

17 Claims, 3 Drawing Figures

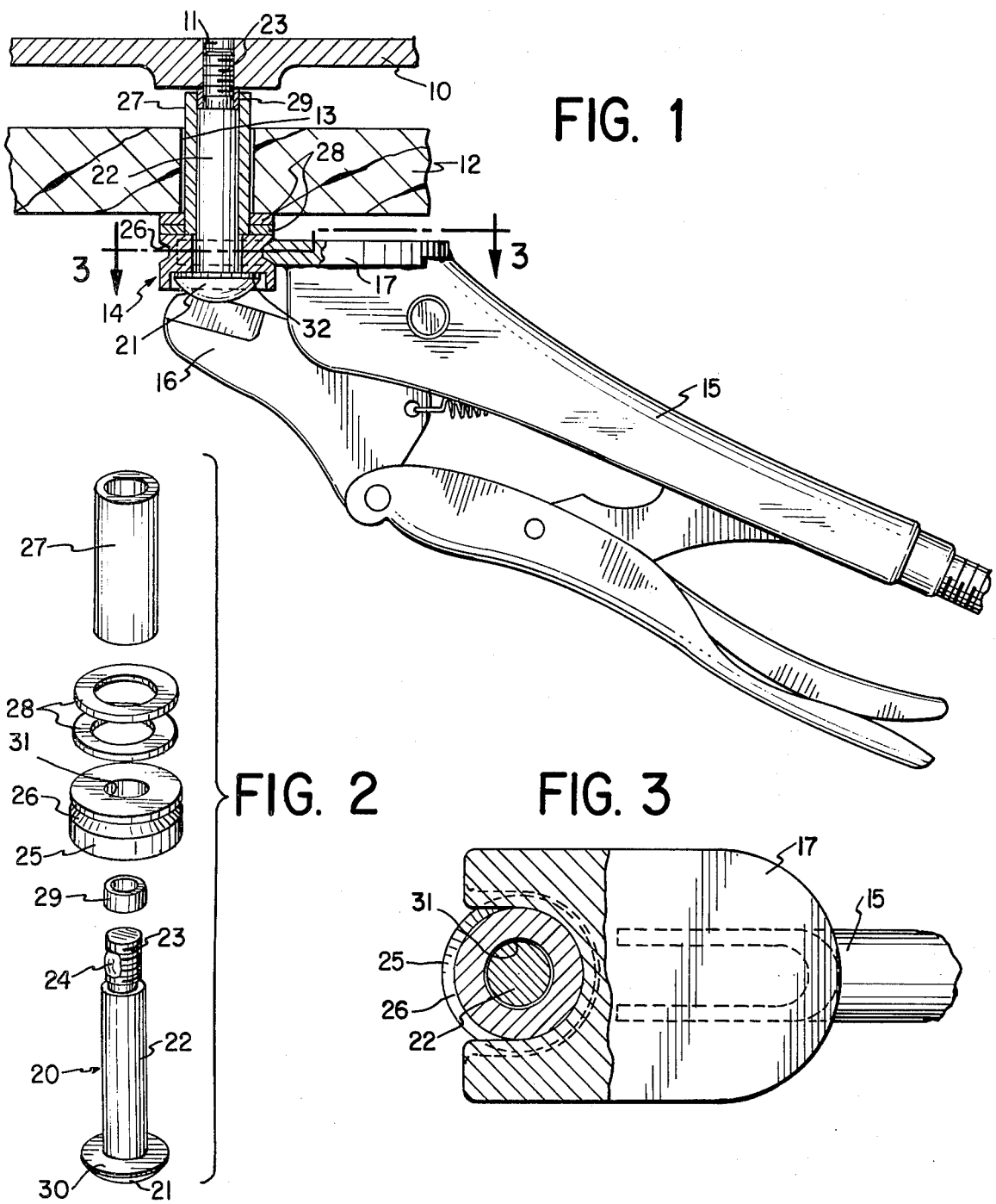

3,924,507

FASTENER APPARATUS

BACKGROUND OF THE INVENTION

This is a continuation of application Ser. No. 341,824 filed Mar. 16, 1973, now abandoned.

This invention relates to fastener apparatus, and more particularly to theft-resistant apparatus for attaching an object to a platform or other object.

The problems of securing valuable machinery such as office equipment and typewriters against theft and vandalism are formidable and well known. Each year millions of dollars are lost through the unauthorized removal of such property, but until now no ready solution to this problem has been available.

The present invention, however, provides a simple, economical and easily manufactured means for preventing the theft of such equipment. The fastener apparatus disclosed herein can be easily installed to secure the widest range of office equipment, and when properly installed it resists all efforts to wrench, chisel, pry, hammer or saw it free from the equipment which it attaches to a desk, platform or other object.

BRIEF SUMMARY OF THE INVENTION

In order to secure an object having a threaded aperture to a platform or other object, the theft-resistant fastener apparatus of the present invention provides a bolt having a head and a shank, at least a portion of said shank being threaded, said head having a smooth non-wrenchable surface. A cup washer adapted to be rotatably mounted on the shank of the bolt is also provided, the cup washer having side walls which partially enclose the head of the bolt when the cup washer is positioned on the shank adjacent said head. The cup washer is provided with an exterior bearing surface for receiving an externally applied force in a direction parallel to the longitudinal axis of the bolt when the cup washer is so mounted, whereby an externally applied compressive force can be releasably applied by an installation tool between the exposed portion of the head of the bolt and the exterior bearing surface of the cup washer to hold the bolt head and cup washer together in a fixed relationship. While this compressive force is applied, a torquing moment can be applied by the installation tool to the bolt and cup washer to rotate the bolt and thread the threaded portion of the bolt into a threaded aperture in an object to be secured.

In a preferred embodiment of the invention armored sheathing means are rotatably mounted on the shank of the bolt. The sheathing means are of such length that when the bolt has been inserted through a hole in the platform and threaded into the threaded aperture of the object to be secured, it encloses substantially all of the otherwise exposed shank of the bolt, and the cup washer and sheathing means are free to rotate on the shank. Said sheathing means may comprise a cylindrical sleeve and/or a plurality of spacer washers.

The advantages of the present invention will be better understood when the following description of a preferred embodiment is read in connection with the accompanying drawing.

DESCRIPTION OF THE DRAWING

FIG. 1 is a sectional view of a preferred embodiment of the fastener apparatus of the present invention installed in a typical application, showing a preferred installation tool being applied to said embodiment.

FIG. 2 is an exploded perspective view of said preferred embodiment.

FIG. 3 is a plan view of said embodiment and tool in partial section taken along line 3—3 of FIG. 1.

DESCRIPTION OF THE PREFERRED EMBODIMENT

Referring to FIG. 1, an object 10 such as the base plate of a typewriter is pictured having a threaded aperture 11 therein. A platform 12, such as a desk top, to which the typewriter is to be secured is also shown. In a typical application the bottom of the typewriter base 10 will be spaced some distance from the top of the platform 12 on which it is resting because of the existence of the typewriter mounting feet (not shown) at the four corners of the typewriter base. The platform 12 has an aperture 13 therethrough aligned with the threaded aperture 11 on the typewriter base. A preferred embodiment 14 of the fastener apparatus of the present invention is shown in an installed position securing the typewriter base 10 to the platform 12. An installation tool 15 described hereinafter is also shown being applied to the fastener apparatus 14.

The elements which comprise the preferred embodiment of the fastener apparatus 14 are shown in greater detail in FIG. 2. A shoulder bolt 20 of hardened alloy steel has a head 21, and a shank comprising a shoulder portion 22 and a threaded portion 23. The head 21 has a smooth, non-wrenchable rounded surface with a Rockwell C hardness of approximately 40. Also, as clearly shown in FIGS. 1 and 3, the head 21 has a diameter greater than that of shoulder portion 22 and the radially extending underside thereof thus forms a shoulder 30 with respect to the first-mentioned shoulder portion 22. The threaded portion 23 is threaded to mate with the threaded aperture 11 of the typewriter base 10 and is preferably made self-locking by being provided with a nylon patch 24 of the type described in Preziosi U.S. Pat. No. 3,294,139.

A second element of the fastener apparatus is a cylindrical cup washer 25 formed of hardened alloy steel. The cup washer 25 by means of through opening 31 can be rotatably mounted on the shank of the shoulder bolt 20 and when positioned adjacent the head 21 (as shown in FIG. 1) the depending side walls of the cup washer 25 partially enclose said head 21. The cup washer 25 is provided with an exterior annular bearing surface 26 and an interior annular bearing surface 32 which permits the application (described hereinafter) of a compressive force between the cup washer 25 and the second shoulder 30 formed by the bolt head 21.

The fastener apparatus 14 of the illustrated embodiment also advantageously comprises a hardened steel cylindrical sheath 27 dimensioned to slide easily over the shank of the shoulder bolt 20 and pass through the mounting aperture 13 in the platform 12. The embodiment of the illustrated apparatus also employs two steel spacer washers 28 sized to pass easily over the cylindrical sheath 27 but of larger diameter than the mounting aperture 13.

Finally, the preferred embodiment of the apparatus utilizes a cylindrical steel seating washer 29 which is dimensioned to pass easily over the threaded portion 23 of the shoulder bolt 20 and abut against the end of the shoulder portion 22, thus shielding any imperfect thread transition area between the threaded portion 23 and the shoulder portion 22. The axial length of the seating washer 28 is less than the length of the threaded portion 23, so that a fully threaded area is left exposed for proper mating with the threaded aperture 11; thus preventing, as in the case of some typewriter bases where the length of the threaded aperture 11 is small, imperfect threads from mating with the threaded aperture 11. As will become evident from the following description, the seating washer 29 also acts to provide a desirable bearing surface between the shoulder of bolt 20 and the underside of the object surrounding threaded aperture 11.

The illustrated preferred embodiment of the invention is installed in a typical application in the following manner. A mounting aperture 13 is first drilled in the desk top or platform 12 on which the object such as a typewriter is to be attached. The typewriter is then positioned on the platform so that a threaded aperture 11 in the typewriter base is aligned with the mounting aperture 13. If any space exists between the entrance to threaded aperture 11 and the upper (proximal) surface of platform 12 (that being the usual situation) then a cylindrical sleeve 27 sized to pass through the aperture 13 and having a length at least as great as the distance between the entrance to threaded aperture 11 and the lower (distal) surface of said platform 12 is inserted through mounting aperture 13 and pressed into contact with the underside of the typewriter base. If, after pressing the cylindrical sheath 27 against the underside of the typewriter base 10 surrounding the threaded aperture 11 the sheath protrudes more than one thirty-second inch below the distal surface of the platform 12, one or more spacer washers 28 can be mounted over the sheath 27 to completely cover the protruding portion.

Next the shoulder bolt 20 with its associated cup washer 25 and seating washer 29 mounted thereon is passed through the mounting aperture 13 and sleeve 27 and tentatively threaded into the threaded aperture 11 in the typewriter base. The threading and seating of the shoulder bolt 20 can be accomplished with the use of an installation and seating tool 15 shown in FIGS. 1 and 3. The installation tool 15 in its preferred embodiment comprises a pair of pliers having first and second jaws 16 and 17, respectively. A suitable tool which may be modified for these purposes is the pliers manufactured by Peterson Manufacturing Company under the tradename "Visegrip" and described in U.S. Pat. No. 2,280,005. The modification of said pliers entails removing one of the jaws and replacing it by a flat plate 17 having a rounded cutout portion at one end adapted to mate with a portion of the annular bearing surface 26 formed in the side walls of the cup washer 25. The other jaw 16 is advantageously ground to a smooth concave surface. In use the jaw 17 of the tool is positioned in bearing contact with the cup washer surfaces 26 as shown in FIG. 1 and the pliers are closed so that the jaw 16 is brought to bear against the head 21 of the shoulder bolt 20. Further tightening of the pliers forces the interior annular bearing surface 32 of the cup washer 25 tightly against the shoulder 30 formed by the bolt-head 21 so that the bolt and the cup are held together. By applying a turning motion to the handle of the installation tool 15 a corresponding torquing moment can be applied to the cup washer 25 and shoulder bolt 20 so that the threaded portion 23 of the bolt 20 can be threaded into the threaded aperture 11. When the jaws of the installation tool 15 are opened and the tool removed the cup washer 25 and the bolt head 21 are no longer held together and the cup washer 25 is free to rotate on the shaft of shoulder bolt 20. However, said shank is subsequently enclosed along its length by said cup washer 25, spacer washers 28 and cylindrical sleeve 27.

For optimum performance the shoulder bolt and seating washer should be fully seated against the underside of the typewriter since the torque required to unseat the assembly will be much greater than that needed to simply rotate the shoulder bolt. In the absence of the seating washer 29 the rotating shoulder of the shoulder bolt 22 on installation would tend to bite into the area surrounding the aperture 11, damaging the seating surface to prevent the attainment of high seating torque. However, when the seating washer 29 is present the seating washer tends to remain stationary against the underside of the typewriter while the shoulder bolt 22 is rotated. This permits the protection of an undamaged seating surface and high seating loading can readily be obtained.

When the fastener apparatus of the present invention has been properly installed as described the apparatus will resist all normal methods of removal. Since the head 21 has a smooth non-wrenchable surface, and the rotatable cup washer 25 partially encloses the head 21, there is no possibility of gripping the head by standard wrench or plier means. The shank of the bolt is protectively sheathed along its length by rotatable cup washer 25, spacer washers 28 and cylindrical sleeve 27, so that it cannot be gripped for turning and unthreading. The hardened steel of the fastener apparatus together with the freely rotatable sleeve and washers effectively inhibits the use of hammer, saw or chisel to break, sever or turn the bolt 20 in its installed position. In practice, the apparatus can only be removed by use of the installation tool 15. When properly installed, the apparatus exerts no downward clamping force on the underside of the typewriter, which would tend to interfere with the operation of the typewriter.

In securing office equipment such as typewriters to desk tops the installation of the described fastener apparatus in at least two positions on the underside of the equipment will usually be desired.

In certain installations where no space is found to exist between the top surface of the platform 12 and the aperture 11 the use of the cylindrical sleeve 27 may not be required. In other cases where less than one thirty-second inch space exists between the underside of platform 12 and the cup washer 25 as tentatively installed the use of spacer washers 28 will not be necessary.

What is claimed is:

1. Fastener apparatus comprising:
    a. a bolt having a head and a shank, at least a portion of said shank being threaded and said head having a smooth non-wrenchable surface; and
    b. a cup washer adapted to be rotatably mounted on the shank of said bolt and having side walls which partially enclose the head of said bolt when said cup washer is positioned adjacent said head, said side walls having bearing surfaces thereon for receiving force externally applied in a direction parallel to the longitudinal axis of said bolt when the cup washer is so mounted, whereby an externally applied compressive force can be releasably applied to the exposed portion of the head of the bolt and said bearing surfaces of the cup washer to hold said head and cup washer together so that a torquing force can thereupon be applied to said cup washer to rotate the bolt.

2. Fastener apparatus for attaching an object having a threaded aperture to a platform having parallel surfaces proximal and distal to said object and having a through aperture in alignment with said threaded aperture, the apparatus comprising:
   a. a shoulder bolt having a head and a shank, at least a portion of said shank being threaded for mating with said threaded aperture, said head having a smooth non-wrenchable surface;
   b. a cup washer adapted to be rotatably mounted on the shank of said bolt and having side walls partially enclosing the head of the bolt when the cup washer is positioned adjacent said head, the side walls having bearing surfaces thereon for receiving an externally applied force in a direction parallel to the longitudinal axis of the bolt when the cup washer is so mounted;
   c. sheathing means adapted to be rotatably mounted on the shank of said bolt and of such a length that when said bolt and sleeve are inserted into the through aperture of said platform and the bolt has been threaded into the threaded aperture of said object substantially all of the shank of said bolt is enclosed and said cup washer and sheathing means are free to rotate on said shank.

3. Fastener apparatus according to claim 2 wherein said sheathing means comprises a cylindrical sleeve adapted to pass through said through aperture of the platform.

4. Fastener apparatus according to claim 2 wherein said sheathing means comprises at least one spacer washer.

5. Fastener apparatus according to claim 2 wherein the threaded portion of said shank has a patch of thermoplastic material applied thereto.

6. Fastener apparatus according to claim 2 wherein the shank of said bolt comprises a non-threaded shoulder portion proximal to said head and a threaded portion distal from said head, the threaded portion having a smaller diameter than said shoulder portion, the apparatus further comprising a rotatable seating washer mounted on said threaded portion, one side of said seating washer adapted to bear against the end of said shoulder portion and the other side of said washer adapted to bear against the object when said bolt is mated with said threaded aperture.

7. Fastener apparatus according to claim 2 wherein the head of said bolt has a Rockwell C hardness of at least 40.

8. Fastener apparatus according to claim 2 wherein said sheathing means has a Rockwell C hardness of at least 40.

9. Fastener apparatus attaching an object having a threaded aperture to a platform having a through aperture in alignment with said threaded aperture, the apparatus comprising:
   a. a threaded bolt passing through said through aperture and mating with said threaded aperture, the bolt having a head with a smooth non-wrenchable surface;
   b. a cup washer rotatably mounted on the bolt adjacent the head, the cup washer having side walls partially enclosing the head said side walls having bearing surfaces thereon for receiving force externally applied in a direction parallel to the longitudinal axis of the bolt; and
   c. sheathing means rotatably mounted on the bolt and enclosing substantially all of the shank of said bolt, said sheathing means and cup washer being free to rotate on the shank of the bolt.

10. Fastener apparatus comprising:
   a. a bolt having a head and a shank, the diameter of said head being larger than said shank such that the the underside of said head forms an annular bearing shoulder extending outwardly with respect to said shank, said head having a smooth non-wrenchable surface; and
   b. a cup washer adapted to be rotatably mounted on the shank of said bolt and having a depending annular side wall adapted to enclose at least a portion of the head of said bolt when said cup washer is positioned adjacent said head, said annular side wall having an exterior bearing surface thereon for receiving force externally applied in a direction substantially parallel to the longitudinal axis of said bolt when the cup washer is so mounted, said cup washer further including an interior bearing surface whereby an externally applied compressive force can be releasably applied to the head of the bolt and said exterior bearing surface of the cup washer to cause said annular bearing shoulder to bear against said interior bearing surface thereby holding said head and cup washer together so that a torquing force can thereupon be applied to said cup washer to rotate the bolt.

11. The invention of claim 10 wherein said fastener apparatus is adapted for attaching an object having a threaded aperture to a platform having parallel surfaces proximal and distal to said object and having a through aperture in alignment with said threaded aperture, said apparatus further comprising:
   c. sheathing means adapted to be rotatably mounted on the shank of said bolt and of such a length that when said bolt and sleeve are inserted into the through aperture of said platform and the bolt has been threaded into the threaded aperture of said object substantially all of the shank of said bolt is enclosed by said sheathing means and said cup washer and sheathing means are free to rotate on said shank.

12. The invention of claim 11 wherein said sheathing means comprises a cylindrical sleeve adapted to pass through said aperture of the platform.

13. The invention of claim 11 wherein said sheathing means comprises at least one spacer washer.

14. The invention of claim 13 wherein at least a portion of said shank is threaded and the threaded portion of said shank has a patch of thermoplastic material applied thereto.

15. The invention of claim 11 wherein the shank of said bolt comprises a non-threaded shoulder portion proximal to said head and a threaded portion distal from said head, the threaded portion having a smaller diameter than said shoulder portion, the apparatus further comprising a rotatable seating washer mounted on said threaded portion, one end of said seating washer being adapted to bear against said shoulder portion and the other end of said washer being adapted to bear against the object when said bolt is mated with said threaded aperture.

16. The invention of claim 11 wherein the head of said bolt has a Rockwell C hardness of at least 40.

17. The invention of claim 11 wherein said sheathing means has a Rockwell C hardness of at least 40.

* * * * *